United States Patent [19]

Spruijt et al.

[11] 4,394,067
[45] Jul. 19, 1983

[54] DISPLAY DEVICE

[75] Inventors: Aloysius M. J. M. Spruijt, Eindhoven; Matheus A. T. Wijburg, Nijmegen; Gerardus C. M. Benschop, Nijmegen; Hendrikus J. M. Vos, Nijmegen, all of Netherlands

[73] Assignee: U.S. Philips Corporation, New York, N.Y.

[21] Appl. No.: 184,562

[22] Filed: Sep. 5, 1980

[30] Foreign Application Priority Data

Sep. 7, 1979 [NL] Netherlands .......... 7906695

[51] Int. Cl.$^3$ .......... G02F 1/133; G02F 1/13
[52] U.S. Cl. .......... 350/334; 350/332
[58] Field of Search .......... 350/336, 332, 334, 331, 350/343, 340, 341

[56] References Cited

U.S. PATENT DOCUMENTS

| 3,807,127 | 4/1974 | Stern | 350/343 |
| 3,954,325 | 5/1976 | Borden | 350/334 |
| 3,961,843 | 6/1976 | Nakamura et al. | 350/341 |
| 4,283,118 | 8/1981 | Inoue | 350/334 |

FOREIGN PATENT DOCUMENTS 53-59398 9/1976 Japan.

OTHER PUBLICATIONS

IEEE, A Hybrid Liquid Crystal Display with a Small Number of Interconnections, Gerritsma and Lorteye, vol. 61, pp. 829-831.

Primary Examiner—John K. Corbin
Assistant Examiner—Paul M. Dzierzynski
Attorney, Agent, or Firm—Paul R. Miller

[57] ABSTRACT

A display device is provided having a layer of liquid crystal in a space enclosed by a rim of sealing material between two supporting plates. One supporting plate has a pattern of electrodes to be driven individually with supply electrodes and a number of external connection electrodes. The supply electrodes and connection electrodes are connected to at least one non-encapsulated IC-crystal provided on the one supporting plate. To provide protection for IC-crystal and to minimize a non-effective display area, the IC-crystals are accommodated in recesses of the rim of sealing material of the display device.

19 Claims, 3 Drawing Figures

DISPLAY DEVICE

The invention relates to a display device comprising a layer of liquid crystal in a space enclosed by a rim of sealing material between two supporting plates of which one supporting plate has a pattern of electrodes to be driven individually by supply electrodes, which supporting plate furthermore has a number of external connection electrodes with the supply electrodes and connection electrodes being connected to contact pads of at least one non-encapsulated IC-crystal.

Such a display device is known from the article "A Hybrid Liquid Crystal Display with a Small Number of Interconnections" in Proceedings of the I.E.E.E., Vol. 61, No. 7, p. 829. By providing a part of the control electronics in the form of an integrated circuit (IC) directly on the supporting plate with the pattern of electrodes to be driven individually, a considerable reduction is obtained of the number of electric connections to be made from the liquid crystal display device to the exterior. For the example described of a numerical display device having nine digits each constructed from seven segments, this means that the number of connections is reduced from 63 to 4. As described in the above-mentioned article, a non-encapsulated IC-crystal, that is a crystal without the usual housing, can be provided on the supporting plate. The use of non-encapsulated IC-crystals results in an important saving of the visually useless space compared with an IC having a housing. The contact pads of the IC crystal can be secured to the supply electrodes and connection electrodes by means of soldering balls. The usual soldering methods and thermocompression methods may be used in combination with a suitable metallization of the supply electrodes and connection electrodes.

In the known device the IC-crystal is provided on the supporting plate outside the envelope of the actual liquid crystal cell. After assembly of the IC-crystal, the IC-crystal should be provided with a mechanical and electrical protection. The possibility of damage of the IC-crystal, however, for example when incorporating the display device in an apparatus or exposing it to a warm moist atmosphere, is not entirely excluded. It is therefore the object of the invention to provide a display device in which the possibility of damage of the IC-crystal is substantially excluded.

According to the invention, a display device of the kind mentioned in the opening paragraph is characterized in that the at least one IC-crystal is accommodated in the rim of sealing material between the supporting plates. The glass plates and the rim of sealing material provide a good mechanical and impervious protection of the IC-crystals.

An embodiment of a display device according to the invention is characterized in that the other supporting plate has a cavity to partly accommodate the IC-crystals. In the nowadays conventionally used liquid crystal display devices the distance between the supporting plates is approximately 4–30 $\mu$m. The thickness of an IC-crystal is approximately 250 $\mu$m. In order to be able to accommodate an IC-crystal in the rim of sealing material, a cavity is recessed in the other supporting plate, for example, by means of ultrasonic drilling.

A further embodiment of a display device in accordance with the invention is characterized in that the connections between the surfaces of the supply electrodes and connection electrodes and the contact pads of the IC-crystal are each formed by a ball of gold which is provided on one of the surfaces to be joined and which is secured to the other surface by means of a conductive glue. The contact surfaces of IC-crystal are usually of aluminium. An oxide layer is rapidly formed on the aluminium which impedes the making of a good electric connection. The advantage of the use of gold balls is that they penetrate through the oxide layer. The adhesion is obtained by means of a conductive glue which can be incorporated with the gold balls in a simple manner.

It is to be noted that it is known per se from Japanese Patent Application No. 53-59398 laid open to public inspection to connect an IC-crystal to the electrode pattern of a liquid crystal display device by means of conductive resin balls.

Another further embodiment of a display device in accordance with the invention is characterized in that each of the supporting plates is provided with a liquid crystal-orienting layer, the orienting layer on the supporting plate on which the IC-crystal is provided also covering the IC-crystal. As a result of this the IC-crystal is provided with an extra protective layer.

A suitable liquid crystal-orienting layer is a polyparaxylylene layer. This layer is provided by means of a chemical vapour deposition method. The advantage of this method is that the surface of the IC-crystal facing the supporting plate, the so-called active surface, is also covered and passivated.

In a display device in accordance with the invention the rim of sealing material is preferably formed by a frame of a thermoplastic material, in particular a polyethylene frame. The cavity for the IC-crystal can be provided simply in such a frame. The frame is laid between the glass plates over the IC-crystal after which the assembly is joined by heating.

Still another embodiment of a display device is characterized in that the rim of sealing material is formed by a rim of glass enamel. Prior to providing the IC-crystal the glass enamel is provided by silk screening and then previtrified. After providing the IC-crystal the supporting plates are joined by heating to a temperature of approximately 450°–550° C.

In a rim of glass enamel the connections between the surfaces of the supply electrodes and connection electrodes and the contact pads of the IC-crystal are preferably each formed by a thermocompression bond or a soldered joint. Glued joints cannot be used in this case since they cannot withstand temperatures of 450°–550° C.

The invention will now be described in greater detail with reference to the accompanying drawing, of which FIG. 1 is a sectional view of a display device according to the invention.

Figure 1:
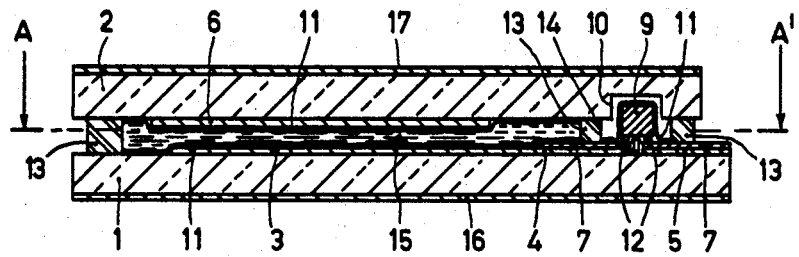

The display device shown in FIG. 1 comprises two parallel glass supporting plates 1 and 2. A pattern of electrodes 3 to be driven individually is provided on the supporting plate 1 with supply electrodes 4 and external connection electrodes 5. An opposite electrode 6 which is common for the pattern of electrodes 3 is provided on the supporting plate 2. In addition to one common opposite electrode, several opposite electrodes may alternatively be used as is usual in a so-called time multiplexing drive of the display device. The electrodes 3, 4, 5 and 6 are transparent and are manufactured from indium-tin oxide which may be provided by vapour deposition, sputtering, silk screening or a chemical vapour deposition process.

In order to reduce the resistance of the thin supply electrodes 4 and connection electrodes 5, these are provided with a metallization 7 formed by successively provided layers of Ti, Ni and Au, which may be provided by means of electrodeposition or electroless deposition or by vacuum sputtering or vapour deposition. The metallization 7 may also be formed by successively provided layers of Cr, Ni and Au or by a layer of electroless Ni or by layers of other metals. The thickness of the metallization 7 is determined by the sheet resistance of the metals. The indium-tin oxide electrodes 3, 4, 5 and 6 have a thickness of approximately 0.15 $\mu$m and the thickness of the metallization layer 7 is approximately 0.3 $\mu$m. An IC-crystal 9 is secured to the metallization layer 7 on the supply electrodes 4 and the connection electrodes 5 by means of gold balls 12. The connection of the IC-crystal will be described in detail with reference to FIG. 2. The IC-crystal 9 is approximately 2 mm square and has a thickness of approximately 250 $\mu$m. A cavity 10 is drilled in the glass supporting plate 2 so as to partly accommodate the IC-crystal 9. The cavity 10 has a diameter of approximately 3.5 mm and a depth of approximately 350 $\mu$m and is provided in the supporting plate 2 by ultrasonic drilling. Liquid crystal-orienting layers 11 of polyparaxylylene are provided on the supporting plates 1 and 2 in a thickness of approximately 0.1 $\mu$m. The polyparaxylylene is provided by means of a so-called chemical vapour deposition process, after which the layer obtains further orienting properties by polishing it in one direction. This has the advantage that not only the free surface but also the surface facing the supporting plate 1, the so-called active surface, of the IC-crystal 9 is coated.

The liquid crystal-orienting layers 11 may also be provided by the oblique vapour deposition of, for example, SiO and MgF$_2$ or by using surface-active substances, such as soaps, silane and alcohol. Liquid crystal-orienting layer is to be understood to mean not only a layer which orients the liquid crystal molecules in one given direction, but also a layer which produces a random orientation of the liquid crystal molecules. This latter is used, for example, in display devices which use the so-called dynamic scattering effect. The supporting plates 1 and 2 are kept at a distance of 12 $\mu$m and the device is sealed by a sealing rim of a polyethylene frame 13 in which a cavity 14 for the IC-crystal 9 is recessed. During the manufacture of the device the sealing rim 13 is laid between the supporting plates 1 and 2 over the IC-crystal 9 after which a joint which is uniform in thickness is produced between the supporting plates 1 and 2 by heating to a temperature of approximately 120° C. to 220° C.

It is also possible to seal the display device by means of a rim of glass enamel. The glass enamel is provided by silk screening and then previtrified by heating preferably prior to assembling the IC-crystal 9. After providing the IC-crystal 9 the supporting plates are joined by heating to a temperature of approximately 450°–550° C. It is to be noted that when a glass enamel sealing rim is used, only inorganic liquid crystal-orienting layers may be used, for example, SiO and MgF$_2$.

By a filling aperture (not shown) in the supporting plate 2 the display device is filled with a nematic liquid crystal having positive dielectric anisotropy 15, for example, p-alkyl-p'-cyanobiphenyl compounds, which are available from Messrs. Merck under the name of E7, or p-alkyl(oxy)-p'cyanobiphenylene compounds, phenylcyclohexane compounds and azoxy with thioester compounds which are available also from Messrs. Merck by the names ZLI284 ZLI1132 and ZLI935, respectively. The surfaces of the supporting plates 1 and 2 remote from each other comprise polarizers 16 and 17 having mutually perpendicular directions of polarization so as to make the twisted nematic field effect visible.

In a display device according to the invention other electro-optical display effects with liquid crystals may also be used, for example, the dynamic scattering effect, the guest-host effect, the electrically induced birefringence effect and the effect of the so-called cholesteric-nematic junction.

Figure 2:
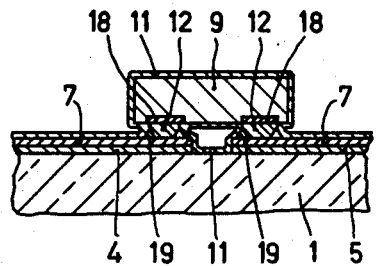
FIG. 2 shows in detail the connection of the IC-crystal of FIG. 1.

FIG. 2 shows in detail the connection of the IC-crystal 9 to the electrode pattern of FIG. 1. The IC-crystal 9 has contact pads 18 of aluminium. First, gold balls 12 are provided on the contact pads 18 and also penetrate through an oxide layer formed on the aluminium surfaces. With the gold balls 12 a little of a conductive glue paste 19, for example, gold filled epoxy resin, is taken up after which the IC-crystal 9 is pressed on the metallization 7 of the supply electrodes 4 and connection electrodes 5. The glue 19 is then cured by thermal heating with the gold balls 12 serving as spacers for the IC-crystal 9 and the metallization layer 7.

It is also possible to connect the IC-crystal 9 to the electrode pattern only by means of balls of a conductive glue. The glue balls may then be provided on the aluminium contact pads of the IC-crystal or on the electrode pattern by means of silk screening or stamping. The IC-crystal may also be connected by means of solder balls to the indium-tin oxide electrodes provided with a suitable metallization.

It is to be noted that when a sealing rim of glass enamel is used, no glue may be used to connect the IC-crystal since this does not withstand temperatures of 450°–550° C. which are necessary to join the glass plates and the glass enamel sealing rim. In this case the IC-crystal may be connected to the electrode pattern by means of, for example, thermocompression or soldering methods.

Figure 3:
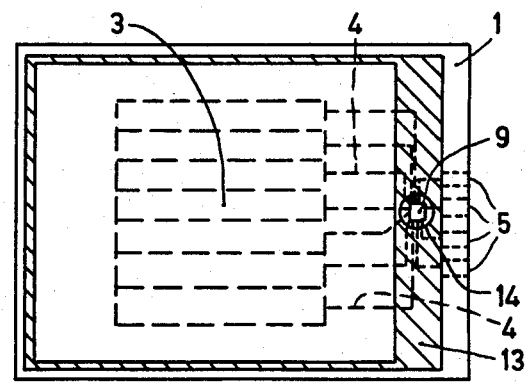
FIG. 3 is a sectional view taken on the line AA' of FIG. 1.

FIG. 3 is a sectional view taken on the line AA' of the display device shown in FIG. 1. The transparent electrode pattern 3 with supply electrodes 4 and connection electrodes 5 provided on the supporting plate 1 is shown in broken lines. The cavity 14 for accommodating the IC-crystal 9 is recessed in the sealing rim 13 of a polyethylene frame. For this purpose the sealing rim 13 is made wider on the side where the IC-crystal is present than on the other sides.

In addition to the embodiments shown in which one IC-crystal is accommodated in the rim of sealing material, it is also possible in a dislay device in accordance with the invention to accommodate more than one IC-crystal in the rim of sealing material.

What is claimed is:

1. A display device comprising two supporting plates separated by a space; a layer of liquid crystal in said space; a rim of sealing material between said two supporting plates and enclosing said layer of liquid crystal; a pattern of electrodes on one of said supporting plates facing said layer of liquid crystal; at least one further electrode on the other of said supporting plates facing said layer of liquid crystal; supply electrodes on said one supporting plate individually driving said pattern of electrodes; at least one non-encapsulated IC crystal accomodated in said rim of sealing material between said two supporting plates; contact pads of said IC crystal connected to said supply electrodes; and a number of external connection electrodes connected to other contact pads of said IC crystal to be in communication with said supply electrodes.

2. A display device according to claim 1, wherein a cavity in said other of said supporting plates opening toward said one supporting plate at least partly accommodates said IC crystal.

3. A display device according to claim 2, wherein gold balls provide electrical connection between said supply electrodes and said contact pads of said IC crystal, and between said connection electrodes and said other contact pads of said IC crystal; and wherein a conductive glue secures said gold balls to one of said supply electrodes and said contact pads and to one of said connection electrodes and said other contact pads.

4. A display device according to claim 3, wherein a liquid crystal orienting layer is provided facing said liquid crystal on each of said two supporting plates, said orienting layer also covering said IC crystal.

5. A display device according to claim 4, wherein said liquid crystal orienting layer is a polyparaxylylene layer.

6. A display device according to claim 4, wherein said rim of sealing material is a frame of thermoplastic material, said thermoplastic material being polyethylene.

7. A display device according to claim 4, wherein said rim of sealing material is a rim of glass enamel.

8. A display device according to claim 7, wherein one of a thermocompression bond or a soldered joint form connection surfaces between said contact pads and said supply electrodes and between said other contact pads and said connection electrodes.

9. A display device according to claim 3, wherein said rim of sealing material is a frame of thermoplastic material, said thermoplastic material being polyethylene.

10. A display device according to claim 2, wherein a liquid crystal orienting layer is provided facing said liquid crystal on each of said two supporting plates, said orienting layer also covering said IC crystal.

11. A display device according to claim 10, wherein said liquid crystal orienting layer is a polyparaxylylene layer.

12. A display devic according to claim 2, wherein said rim of sealing material is a frame of thermoplastic material, said thermoplastic material being polyethylene.

13. A display device according to claim 2, wherein said rim of sealing material is a rim of glass enamel.

14. A display device according to claim 13, wherein one of a thermocompression bond or a soldered joint form connection surfaces between said contact pads and said supply electrodes and between said other contact pads and said connection electrodes.

15. A display device according to claim 1, wherein a liquid crystal orienting layer is provided facing said liquid crystal on each of said two supporting plates, said orienting layer also covering said IC crystal.

16. A display device according to claim 15, wherein said liquid crystal orienting layer is a polyparaxylylene layer.

17. A display device according to claim 1, wherein said rim of sealing material is a frame of thermoplastic material, said thermoplastic material being polyethylene.

18. A display device according to claim 1, wherein said rim of sealing material is a rim of glass enamel.

19. A display device according to claim 18, wherein one of a thermocompression bond or a soldered joint form conection surfaces between said contact pads and said supply electrodes and between said other contact pads and said connection electrodes.

* * * * *